US006541883B2

(12) United States Patent
Uffelman (10) Patent No.: US 6,541,883 B2
(45) Date of Patent: Apr. 1, 2003

(54) RFI SHIELD STRUCTURE FOR AN ELECTRIC MOTOR IN A FUEL PUMP HOUSING

(75) Inventor: Bradley L. Uffelman, Caro, MI (US)

(73) Assignee: Walbro Corporation, Case City, WA (US)

( * ) Notice: Subject to any disclaimer, the term of this patent is extended or adjusted under 35 U.S.C. 154(b) by 0 days.

(21) Appl. No.: 09/846,458

(22) Filed: May 1, 2001

(65) Prior Publication Data

US 2002/0163263 A1 Nov. 7, 2002

(51) Int. Cl.⁷ .................... H02K 11/00; H02K 5/00; H02K 15/12
(52) U.S. Cl. ................ 310/71; 310/89; 310/45
(58) Field of Search ............... 310/71, 89, 87, 310/85, 68 R, 66, 45; 417/24, 44.1, 45, 44.11, 50, 129, 410.1, 411, 505

(56) References Cited

U.S. PATENT DOCUMENTS

| 2,514,693 A | * | 7/1950 | Chapman ............... 310/71 |
| 4,515,417 A | * | 5/1985 | Shiraishi ............... 384/445 |
| 4,619,588 A | * | 10/1986 | Moore, III ............. 418/171 |
| 4,623,764 A | * | 11/1986 | Petre et al. ............ 174/51 |
| 4,780,953 A | * | 11/1988 | Wheeler et al. ........ 310/89 |
| 4,845,393 A | | 7/1989 | Burgess et al. ........ 310/51 |
| 5,697,769 A | | 12/1997 | Kobman et al. ........ 417/410 |
| 5,698,918 A | * | 12/1997 | Shinoda et al. ........ 310/89 |
| 5,734,212 A | | 3/1998 | Uffelman .............. 310/51 |

FOREIGN PATENT DOCUMENTS

| JP | 63283447 A | * | 11/1988 | ......... H02K/11/00 |
| WO | WO 200060231 A1 | * | 10/2000 | ......... H02K/5/22 |

* cited by examiner

Primary Examiner—Nestor Ramirez
Assistant Examiner—Guillermo Perez
(74) Attorney, Agent, or Firm—Reising, Ethington, Barnes, Kisselle, Learman & McCulloch, P.C.

(57) ABSTRACT

A shield structure for reducing radio frequency interference (RFI) from an electric motor situated within a fuel pump housing having an end with a fuel inlet and another end with a fuel outlet. The shield structure includes, first of all, an electrically insulative and hollow cup-like outer cover mountable on an end of the fuel pump housing adjacent the brushes and commutator of the electric motor. The outer cover has an inner surface, an outer surface, and preferably a fuel outlet opening defined therethrough. In addition, the shield structure includes an electrically conductive outer coat layer formed on substantially all of the outer surface of the outer cover. Lastly, the shield structure includes means for electrically grounding the outer coat layer to the electric motor of the fuel pump housing.

20 Claims, 4 Drawing Sheets

RFI SHIELD STRUCTURE FOR AN ELECTRIC MOTOR IN A FUEL PUMP HOUSING

FIELD OF THE INVENTION

The present invention generally relates to a fuel pump for a fuel-injected engine in an automotive vehicle and more particularly relates to the reduction of radio frequency interference (RFI) from an electric fuel pump motor situated within a fuel pump housing.

BACKGROUND OF THE INVENTION

Modernly, various different electrical and electronic systems with increased levels of complexity and sophistication are being incorporated in many automotive vehicles. Whereas some of these systems are generally unaffected by and will even sometimes themselves generate stray electromagnetic wave interference (EMI) or radio frequency interference (RFI) (i.e., "noise") during operation, others of these systems need to be protected from such noise in order to function and operate properly. For example, many of the audio systems that are onboard many modem vehicles include highly sophisticated electronics that help ensure high-fidelity sound reproduction. Typically, such audio systems are electrically sensitive and are often adversely affected during operation when exposed to significant amounts of stray noise. Similarly, electronically sophisticated onboard communication systems such as, for example, two-way radios, cellular telephones, and GPS (global positioning satellite) navigational systems are also often adversely affected during operation when exposed to certain amounts of stray noise.

An electric fuel pump motor commonly situated within the housing of a fuel pump for an automotive vehicle is often a significant source of stray noise. Such is particularly true while the electric motor is operating and thereby enabling the fuel pump to successfully draw fuel from a fuel tank and thereafter deliver the fuel under pressure to an engine. For example, when connected to an electrical power source, the electric motor may utilize one or more energized coils or solenoids to operate the fuel pump. In doing so, as the level of electric current conducted through the coils is varied to correspondingly vary the speed of the fuel pump to satisfy the ever-changing fuel needs of the engine, an electromagnetic field with an ever-changing field strength is thereby generated about the coils. This generated electromagnetic field also emanates in the form of a wave and strays from the immediate vicinity of the coils as undesirable noise. Depending on the field strength and the characteristic frequency of the noise, as dictated by the changes in its field strength, the noise may interfere with the electrical signals of sensitive electronic systems that are situated outside of and about the fuel pump housing. As a result, operation of these electronic systems may be adversely affected. As another example, when connected to an electrical power source, "positive" and "negative" brushes which are in electrical and mechanical sliding contact with and conduct electric current to the rotatable commutator of the electric fuel pump motor may cause "brush firing" as the commutator rotates. Such brush firing can generate stray noise that too may adversely affect the operation of electronic systems outside of and about the fuel pump housing. Furthermore, in addition to these two particular examples, other sources of stray noise directly or indirectly associated with the operation of the electric motor are possible as well.

In an attempt to reduce the amount of stray noise directly or indirectly emanating from or associated with the electric fuel pump motor, remedial electric circuits sometimes referred to as "radio frequency interference (RFI) suppression circuits" or "radio frequency noise suppression circuits" have been proposed. Such circuits are typically interconnected between an outside electrical power source and the electric motor. These circuits typically include two choke coils and a capacitor. In particular, one choke coil is electrically connected between the positive terminal of the electrical power source and the positive brush, and the other choke coil is electrically connected between the negative terminal of the electrical power source and the negative brush. The capacitor is electrically connected between corresponding ends of the two choke coils. These circuits are typically situated or mounted on the fuel outlet end of the fuel pump housing. See, for example, U.S. Pat. No. 4,845,393, issued to Burgess et al on Jul. 4, 1989, U.S. Pat. No. 5,697,769, issued to Kobman et al on Dec. 16, 1997, and U.S. Pat. No. 5,734,212, issued to Uffelman on Mar. 31, 1998.

Although such remedial circuits do attain some measure of success in reducing stray noise associated with electric fuel pump motors, such circuits alone, however, sometimes fall short in reducing noise to the extent necessary to prevent increasingly sensitive modern electronic systems from being adversely affected during operation. In light of such, there is a present need in the art for a device, structure, or system that will further reduce, either alone or in conjunction with such remedial circuits, the amount of stray noise associated with electric fuel pump motors.

SUMMARY OF THE INVENTION

The present invention provides a shield structure for reducing radio frequency interference (RFI) from an electric motor situated within a fuel pump housing. The shield structure is ideal for a fuel pump housing that has an end having a fuel inlet and another end having a fuel outlet. According to the present invention, the shield structure basically includes, first of all, an electrically insulative and hollow cup-like outer cover mountable on the fuel outlet end of a fuel pump housing. The outer cover has an inner surface, an outer surface, and, in a preferred embodiment, a fuel outlet opening defined therethrough. In addition, the shield structure also basically includes an electrically conductive outer coat layer formed on substantially all of the outer surface of the outer cover. Furthermore, the shield structure also basically includes means for electrically grounding the outer coat layer to the electric motor of the fuel pump housing.

In a preferred embodiment of the present invention, the outer cover comprises plastic, and the outer coat layer comprises silver. In a highly preferred embodiment, the outer coat layer comprises both silver-plated copper and an acrylic binder. Furthermore, the outer coat layer preferably has a minimum thickness of about 0.010 millimeters and more preferably has a minimum thickness of about 0.012 millimeters.

Also, in a preferred embodiment of the present invention, the shield structure further includes a fuel outlet conduit and two open-ended cylindrical retainer chambers. The fuel outlet conduit is preferably integral with both the inner surface and the outer surface of the outer cover such that the fuel outlet conduit defines the fuel outlet opening through both the outer cover and the outer coat layer. The two open-ended cylindrical retainer chambers are preferably defined through both the outer cover and the outer coat layer.

Further, in a preferred embodiment of the present invention, the shield structure further includes a fuel relief conduit. The fuel relief conduit is preferably integral with the inner surface of the outer cover such that the fuel relief conduit defines a fuel relief opening through both the outer cover and the outer coat layer. The fuel relief conduit is preferably tapered for thereby accommodating and seating a fuel relief ball valve.

Still further, in a preferred embodiment of the present invention, the shield structure further includes two electrical conduits. The two electrical conduits are preferably integral with the inner surface of the outer cover such that the two electrical conduits define two electrical conduit openings through both the outer cover and the outer coat layer. The outer coat layer preferably has discontinuities on the outer surface of the outer cover such that the outer coat layer is radially spaced away from each of the two electrical conduit openings on the outer surface. In such a configuration, the two electrical conduits are capable of closely receiving two electrically conductive pins for communicating electric power to the electric motor in such a way that the two electrically conductive pins are electrically isolated from said outer coat layer.

Lastly, in a preferred embodiment of the present invention, the electrical grounding means includes both an electrical ground conduit and an electrically conductive inner coat layer formed on the inner surface of the electrical ground conduit. The electrical ground conduit is preferably integral with the inner surface of the outer cover such that the electrical ground conduit defines an electrical ground opening through both the outer cover and the outer coat layer. The inner coat layer formed on the inner surface of the electrical ground conduit is preferably conterminous with the outer coat layer formed on the outer surface of the outer cover.

Objects, features, and advantages of this invention include providing a shield structure which is capable of further reducing the amount of stray noise associated with electric fuel pump motors as well as providing a shield structure which is compact, rugged, durable, of relatively simple design and economical manufacture and assembly, and has a long useful life in service.

BRIEF DESCRIPTION OF THE DRAWINGS

These and other objects, features, and advantages of this invention will be apparent from the following detailed description of the preferred embodiments and best mode, appended claims, and accompanying drawings in which:

DETAILED DESCRIPTION OF THE PREFERRED EMBODIMENT

The present invention provides a shield structure for reducing radio frequency interference (RFI) or noise from an electric fuel pump motor situated within a fuel pump housing. The shield structure is ideal for a fuel pump housing that has an end having a fuel inlet and another end having a fuel outlet. Given that positive and negative brushes, a rotatable commutator, and the electric fuel pump motor are typically situated at the fuel outlet end of such a fuel pump housing, the shield structure in its preferred embodiment is mountable on the fuel outlet end of the fuel pump housing in a corresponding fashion. Thus, when the shield structure is properly mounted, the shield structure serves as an electromagnetic shield which reduces the amount of stray noise from the electric fuel pump motor by essentially preventing the noise from emanating beyond the fuel pump housing. In this way, stray noise is essentially prevented from both reaching and adversely affecting the operation of sensitive electronic systems that are situated outside of and about the fuel pump housing. A detailed description of a preferred embodiment of the shield structure according to the present invention is set forth hereinbelow.

Figures 1, 2, 3:
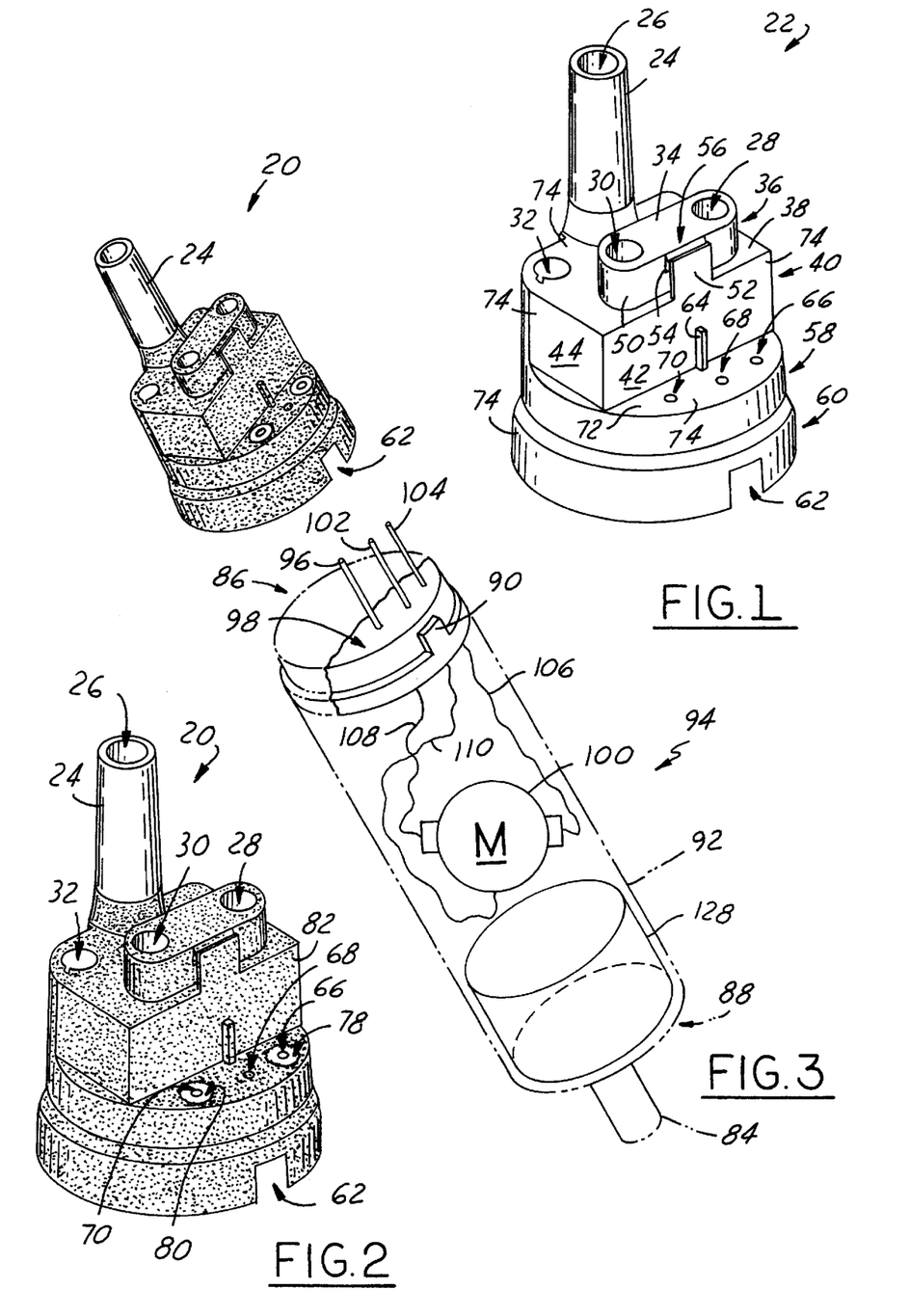
FIG. 1 is a perspective view of an electrically insulative and hollow cup-like outer cover which is includable in a radio-frequency interference (RFI) shield structure according to the present invention.
FIG. 2 is a perspective view of an RFI shield structure according to the present invention, wherein the shield structure includes the outer cover of FIG. 1 and an electrically conductive outer coat layer formed thereon.
FIG. 3 is a perspective view of the shield structure of FIG. 2 exploded from the fuel outlet end of a fuel pump housing.
Figure 4:
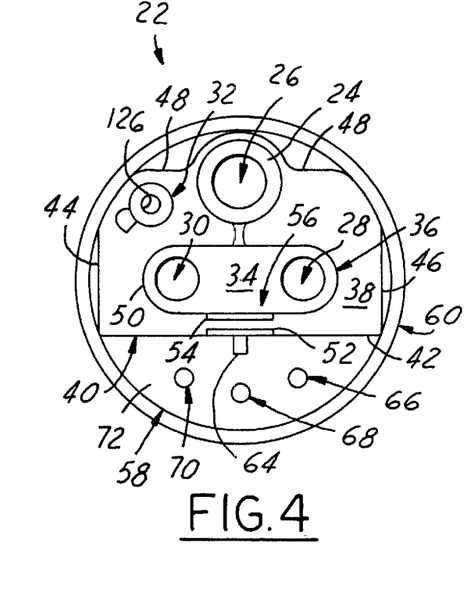
FIG. 4 is a top view of the outer cover of FIG. 1.

As illustrated in FIGS. 1–13, a shield structure 20 according to the present invention includes, first of all, an electrically insulative and hollow cup-like outer cover 22 which is mountable on the fuel outlet end 86 of a fuel pump housing 92. The outer cover 22 preferably comprises plastic. As best illustrated in FIG. 1, the outer cover 22 generally includes, from bottom to top, a skirt section 60, a substantially cylindrical section 58, a block-like midsection 40, and an elongate section 36 which are successively integral with each other. The skirt section 60 of the outer cover 22 has an orientation notch 62 defined therein. The orientation notch 62 facilitates proper mounting of the shield structure 20 onto the fuel outlet end 86 of the fuel pump housing 92. The cylindrical section 58 is made integral with the block-like midsection 40, at least partially so, by a plateau section 72. As best illustrated in FIGS. 1 and 4, the block-like midsection 40 includes a front sidewall 42, a left sidewall 44, a right sidewall 46, and a rear sidewall 48. These sidewalls of the block-like midsection 40 are made integral with the elongate section 36 by a mesa section 38. As best illustrated in FIGS. 1 and 4, the elongate section 36 includes a curvilinear sidewall 50 and a top section 34. Given such a general configuration of the outer cover 22, the skirt section 60, the cylindrical section 58, the plateau section 72, the block-like midsection 40, the mesa section 38, and the elongate section 36 together define both an inner surface 76 and an outer surface 74 of the outer cover 22.

As best illustrated in FIGS. 1–5 and 8, the shield structure 20 further includes a fuel outlet conduit 24 that is integral with both the inner surface 76 and the outer surface 74 of the outer cover 22 such that the fuel outlet conduit 24 defines a fuel outlet opening 26 completely through the outer cover 22. As suggested by FIG. 3, the fuel outlet conduit 24 serves to communicate fuel under pressure from within the fuel pump housing 92 to an engine (not shown) located outside of the fuel pump housing 92.

As illustrated in FIGS. 1–5, 8, and 10, the shield structure 20 further includes a fuel relief conduit 124 that is integral with the inner surface 76 of the outer cover 22 such that the fuel relief conduit 124 defines a fuel relief opening 32 completely through the outer cover 22. The fuel relief conduit 124 has a tapered section 126 suited for accommodating and seating a fuel relief ball valve (not shown) thereon. In a preferred configuration, the fuel relief ball valve is yieldably biased against the tapered section 126 by a compression spring (not shown) extending within the fuel relief conduit 124. The compression spring has one end against the fuel relief ball valve and another end against an annular retainer structure (not shown) that is fixedly lodged at the upper end of the fuel relief conduit 124. For an example of a similar configuration involving a fuel relief ball valve, see U.S. Pat. No. 5,697,769, issued to Kobman et al on Dec. 16, 1997, the contents and teachings of which are incorporated by reference herein in their entirety.

As illustrated in FIGS. 1–6, 10, and 12, the shield structure 20 further includes two open-ended cylindrical retainer chambers, a left retainer chamber 114 and a right retainer chamber 116, defined in the elongate section 36 of the outer cover 22. The left retainer chamber 114 particularly defines a left retainer opening 30 completely through the outer cover 22, and the right retainer chamber 116 particularly defines a right retainer opening 28 completely through the outer cover 22 as well. These two retainer chambers are suited for accommodating and lodging two retainer structures (not shown) therein, one retainer structure in each retainer chamber. In a preferred configuration, the two retainer structures are pressed into the two retainer chambers and are thereby fixedly lodged therein. Within the hollow of the shield structure 20, the two retainer structures abut the ends of two compression springs (not shown) such that the opposite ends of the two compression springs urge positive and negative brushes (not particularly shown) into electrical and mechanical sliding contact with the rotatable commutator (not particularly shown) of an electric fuel pump motor 100. For an example of a similar configuration involving two retainer structures, see again U.S. Pat. No. 5,697,769.

As illustrated in FIGS. 1–6, 10, and 12, the shield structure 20 further includes two electrical conduits and an electrical ground conduit 120. The two electrical conduits include both a left electrical conduit 118 and a right electrical conduit 122 that are integral with the inner surface 76 of the outer cover 22. The electrical ground conduit 120, likewise, is integral with the inner surface 76 of the outer cover 22 as well. The left electrical conduit 118 particularly defines a left electrical conduit opening 70 completely through the plateau section 72 of the outer cover 22, and the right electrical conduit 122 particularly defines a right electrical conduit opening 66 completely through the plateau section 72 of the outer cover 22. Similarly, the electrical ground conduit 120 particularly defines an electrical ground opening 68 completely through the plateau section 72 of the outer cover 22.

As illustrated in FIGS. 1–7 and 10–13, the shield structure 20 further includes a clip 56 and a tongue structure 64. The clip 56 includes both a tab structure 52 and a jut structure 54 integral with the outer surface 74 of the outer cover 22. The tongue structure 64, likewise, is integral with the outer surface 74 of the outer cover 22 as well. The tab structure 52 is integral particularly with the mesa section 38 of the outer cover 22, and the jut structure 54 is integral particularly with the curvilinear sidewall 50 of the elongate section 36. The tongue structure 64, on the other hand, is integral particularly with both the front sidewall 42 of the block-like midsection 40 and the plateau section 72. Given such a configuration, an "RFI module" similar to the one disclosed in U.S. Pat. No. 5,734,212, issued to Uffelman on Mar. 31, 1998, the contents and teachings of which are incorporated by reference herein in their entirety, can be successfully captured and precisely held in position on the plateau section 74 and against the front sidewall 42 by the clip 56 and the tongue structure 64. Such an RFI module (not shown) includes an RFI suppression circuit which is interconnectable, as will be explained later hereinbelow, between an outside electrical power source and the electric fuel pump motor 100 situated within the fuel pump housing 92.

As illustrated in FIGS. 2, 3, 5, 7, 9, 11, and 13, the shield structure 20 further includes an electrically conductive outer coat layer 82 formed on substantially all of the outer surface 74 of the outer cover 22. Although the outer coat layer 82 may comprise various different and other electrically conductive materials and combinations thereof, the outer coat layer 82 according to the preferred embodiment of the present invention includes silver and more preferably silver-plated copper. Including both silver and copper in the outer coat layer 82 is generally preferable because, first of all, silver and copper have the highest and second highest electrical conductivities of any of the elemental metals. In addition, both silver and copper are generally resistant to many different types of corrosion. Although silver is a precious metal and is generally more expensive than copper, copper inherently has weak adhesion characteristics. In light of such, silver is preferably included along with the copper in the outer coat layer 82 to better facilitate reliable overall adhesion of the outer coat layer 82 on the outer surface 74 of the plastic outer cover 22. Furthermore, in addition to both silver and copper, the outer coat layer 82 preferably includes an acrylic binder as well. Such an acrylic binder in conjunction with the silver and copper thereby renders the outer coat layer 82 as being generally fuel resistant.

Such a preferred composition of materials for forming the outer coat layer 82 pursuant to the present invention is made commercially available as FluoroPlate® WT4-071 Conductive Coating by Orion Industries Ltd. of Chicago, Ill. In experimental tests conducted wherein such a commercial coating is utilized as the outer coat layer 82 of the shield structure 20, it has been determined that a substantially uniform and minimum thickness of at least about 0.010 millimeters and more preferably a minimum thickness of about 0.012 millimeters for the outer coat layer 82 is generally desirable. That is, a general minimum thickness range of about 0.010 millimeters to about 0.012 millimeters has been demonstrated to be sufficiently effective in essentially preventing stray noise associated with the electric fuel pump motor 100 from emanating beyond the shield structure 20 when the shield structure 20 is properly mounted on the fuel pump housing 92. It is to be understood, however, that other minimum thickness ranges may be necessary for other outer coat layers that comprise other elemental compositions and materials. To precisely control the thickness of the outer coat layer 82, commercial processes such as, for example, the Dimension Coat® process or the Dimension Bond® process as performed by the Dimension Bond Corporation of Chicago, Ill. may be utilized.

In general, the outer coat layer 82 of the shield structure 20 is preferably formed on the outer surface 74 of the outer cover 22 by a kinetic spray process. The spray process involves the introduction of elements and materials in particulate form into a jet and directing the jet at the outer surface 74 of the outer cover 22. As illustrated in FIGS. 2, 3, 5, 7, 9, 11, and 13, the sprayed elements and materials from the jet should be selectively masked so that such are generally not introduced onto the upper portion of the fuel outlet conduit 24 and into the fuel outlet opening 26, the fuel relief opening 32, both the left retainer opening 30 and the right retainer opening 28, both the left electrical conduit opening 70 and the right electrical conduit opening 66, the orientation notch 62, and the hollow of the outer cover 22. In this way, in addition to being defined completely through the outer cover 22, each of these named openings is also defined completely through the outer coat layer 82 as well. In addition, the sprayed elements and materials from the jet must also be selectively masked so that the outer coat layer 82 has discontinuities, a left discontinuity 80 and a right discontinuity 78, on the outer surface 74 of the outer cover 22 which generally coincide with the left electrical conduit opening 70 and the right electrical conduit opening 66. The discontinuities should generally have circumferences which are larger than the circumferences of the two electrical conduit openings such that the outer coat layer 82 is radially spaced away from each of the two electrical conduit openings on the outer surface 74 of the outer cover 22. The purpose behind selectively masking and creating such discontinuities in the outer coat layer 82 will be explained later hereinbelow.

Figure 5:
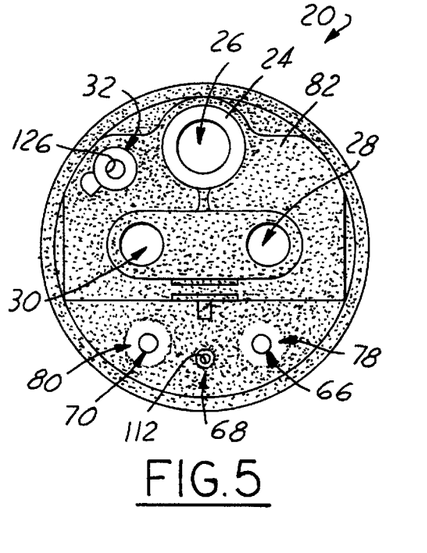
FIG. 5 is a top view of the shield structure of FIG. 2.
Figure 6:
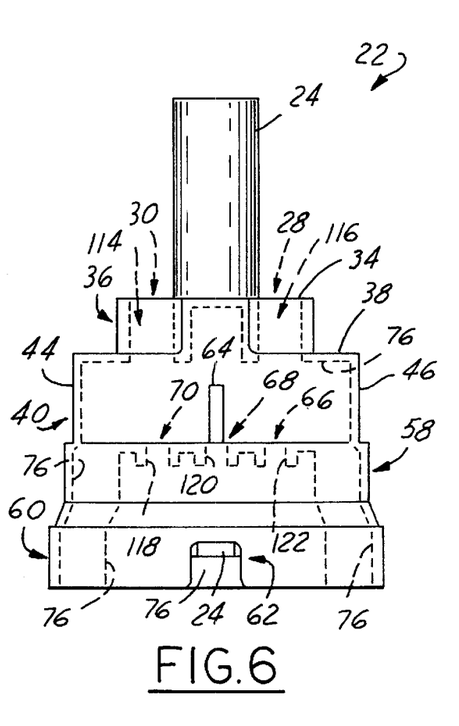
FIG. 6 is a front view of the outer cover of FIG. 1.
Figure 7:
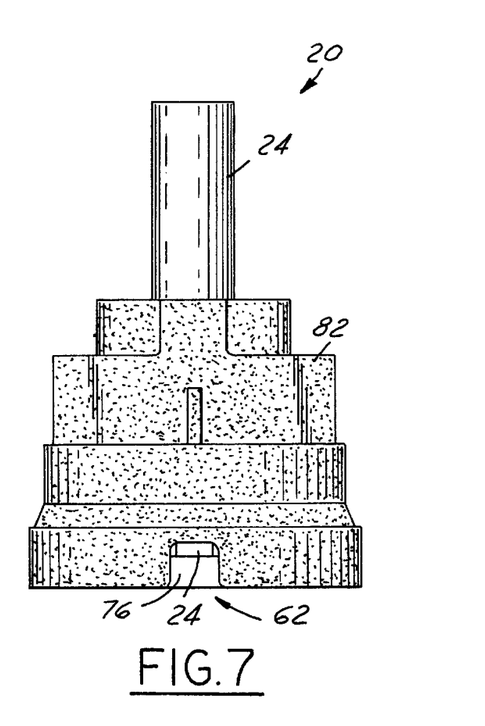
FIG. 7 is a front view of the shield structure of FIG. 2.
Figure 8:
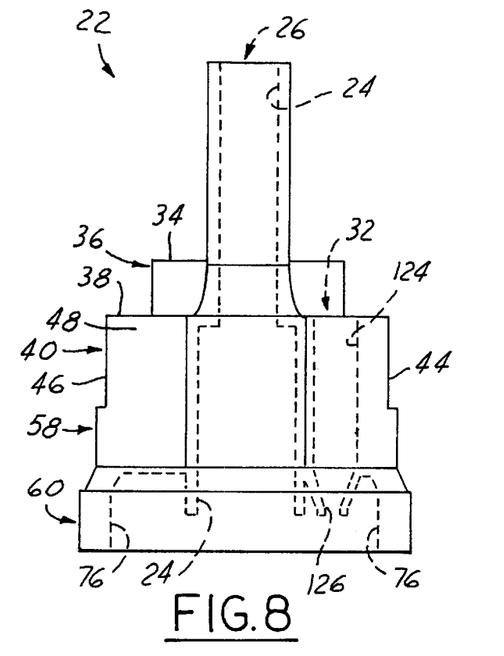
FIG. 8 is a rear view of the outer cover of FIG. 1.
Figure 9:
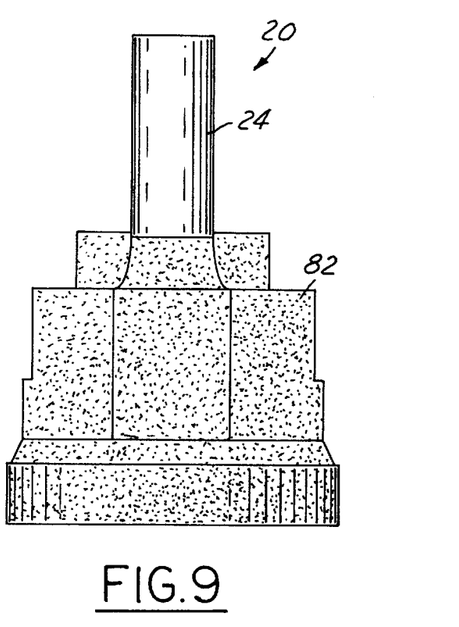
FIG. 9 is a rear view of the shield structure of FIG. 2.
Figure 10:
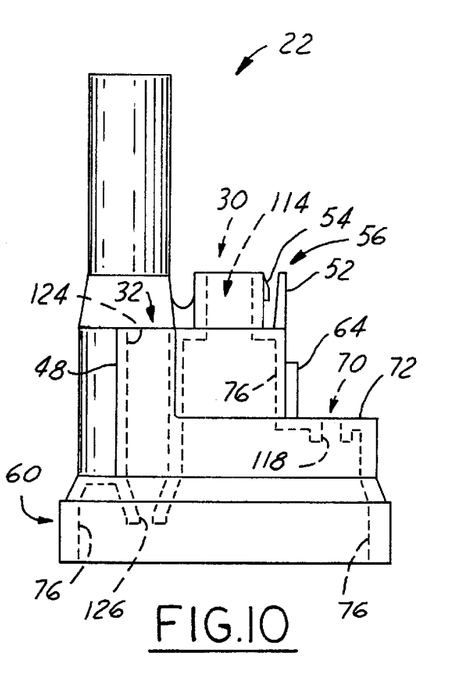
FIG. 10 is a view of the left side of the outer cover of FIG. 1.
Figure 11:
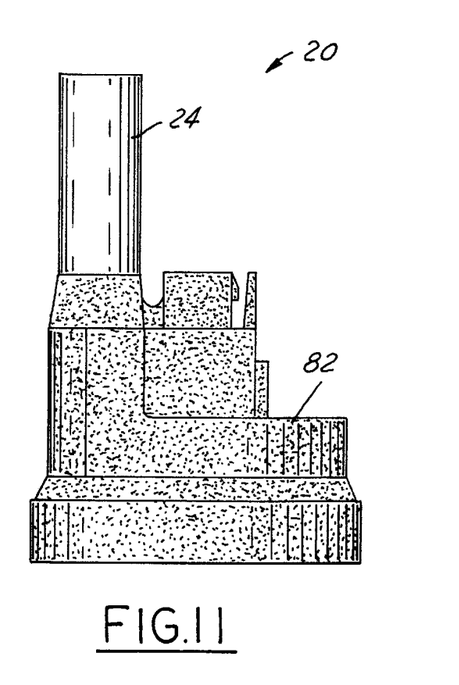
FIG. 11 is a view of the left side of the shield structure of FIG. 2.
Figure 12:
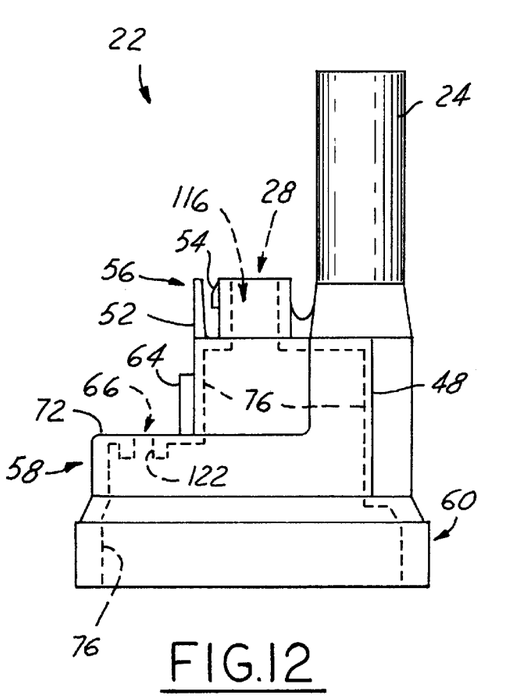
FIG. 12 is a view of the right side of the outer cover of FIG. 1.
Figure 13:
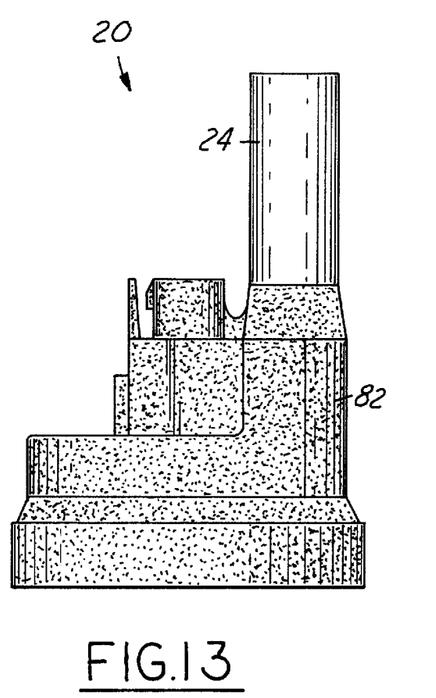
FIG. 13 is a view of the right side of the shield structure of FIG. 2.

While the spray process for forming the outer coat layer 82 is performed, the electrical ground opening 68 and the electrical ground conduit 120, in contrast, are not masked. In this way, as illustrated in FIGS. 5 and 6, an electrically conductive inner coat layer 112 is simultaneously formed on the inner surface of the electrical ground conduit 120 during the spray process. Thus, when the spray process is completed, the inner coat layer 112 comprises the same elements and materials as the outer coat layer 82 and is conterminous with the outer coat layer 82 as well. It should be noted that the diameter of the electrical ground conduit 120 and the thickness of the inner coat layer 112 are such that the electrical ground opening 68 is neither plugged nor significantly clogged during the spray process. As a result, the effective diameter of the electrical ground opening 68 is not significantly reduced, and the electrical ground conduit 120 thus defines the electrical ground opening 68 completely through both the outer cover 22 and the outer coat layer 82 as well as the inner coat layer 112.

As suggested by FIG. 3, the two electrical conduits, the left electrical conduit 118 and the right electrical conduit 122, are particularly suited and capable of closely receiving two electrically conductive pins, a left pin 96 and a right pin 104, that are mounted on an inner cover 98 situated on the fuel outlet end 86 of a fuel pump assembly 94. Similarly, the electrical ground conduit 120 with the inner coat layer 112 is particularly suited and capable of closely receiving an electrically conductive ground pin 102 that is mounted on the inner cover 98 as well. The inner cover 98 includes an orientation tab 90 that is particularly suited for being fittedly received within the orientation notch 62 of the shield structure 20 to thereby facilitate proper mounting of the shield structure 20 onto the fuel outlet end 86 of the fuel pump housing 92 and the overall fuel pump assembly 94. The left pin 96 and the right pin 104 are electrically connected via two wires, a left wire 108 and a right wire 106, to the positive and negative brushes associated with the rotatable commutator of the electric fuel pump motor 100. The ground pin 102, on the other hand, is electrically connected via an electrical ground wire 110 to an electrical ground or an electrical ground circuit of the electric fuel pump motor 100. Given such, when the shield structure 20 is properly mounted onto the fuel outlet end 86 of the fuel pump housing 92, the left pin 96 and the right pin 104 are thereby received by the left electrical conduit 118 and the right electrical conduit 122 such that the free ends of the left pin 96 and the right pin 104 protrude through and slightly beyond both the left electrical conduit opening 70 and the right electrical conduit opening 66 defined in the plateau section 72. At the same time, the ground pin 102 is thereby received by the electrical ground conduit 120. When the shield structure 20 is properly mounted in this fashion, the left discontinuity 80 and the right discontinuity 78 in the outer coat layer 82 which coincide with the left electrical conduit opening 70 and the right electrical conduit opening 66 help ensure that both the left pin 96 and the right pin 104 are electrically isolated from the outer coat layer 82. In contrast, the ground pin 102 comes into electrical contact with the inner coat layer 112 formed on the inner surface of the electrical ground conduit 120. As a result, the outer coat layer 82 becomes electrically connected to the electrical ground of the electric motor 100 via the inner coat layer 112, the ground pin 102, and the ground wire 110.

With further regard to FIG. 3, it is to be noted that the depiction of the electric fuel pump motor 100 situated within the fuel pump housing 92 of the fuel pump assembly 94 is somewhat simplified for the sake of clarity herein and is intended to facilitate a proper general understanding of both the advantages and the novel aspects of the present invention. More precisely, however, the electric motor 100 is typically situated within the fuel pump housing 92 such that its associated commutator is situated at the fuel outlet end 86 of the fuel pump assembly 94 and is particularly situated within the hollow of the underside of the inner cover 98. Furthermore, the positive and negative brushes that are in electrical and mechanical sliding contact with the commutator are typically situated and mounted within the inner cover 98 such that one brush is aligned with the left retainer opening 30 and the other brush is aligned with the right retainer opening 28. In such a configuration, as briefly alluded to earlier hereinabove, the two retainer structures which are pressed into and fixedly lodged within the left retainer chamber 114 and the right retainer chamber 116 serve and act in concert with their two associated compression springs to urge both the positive brush and the negative brush into biased, mechanical sliding contact with the commutator. For an example of a similar configuration involving the mounting of the positive and negative brushes on an inner cover with the commutator situated within the hollow of the underside of the same inner cover, see again U.S. Pat. No. 5,697,769.

With still further regard to FIG. 3, a fuel pump 128 is also situated along with the electric motor 100 within the fuel pump housing 92 of the fuel pump assembly 94. Typically, the fuel pump 128 is primarily situated within the fuel inlet end 88 of the fuel pump housing 92 wherein fuel is drawn into the fuel pump 128 from a fuel tank (not shown) via a fuel inlet 84.

When the shield structure 20 is properly mounted on the fuel outlet end 86 of the fuel pump housing 92, an RFI module, as briefly alluded to earlier hereinabove, can then be added to the overall fuel pump assembly 94 by successfully capturing and precisely holding the RFI module in position on the plateau section 74 and against the front sidewall 42 with the clip 56 and the tongue structure 64. The RFI module has two eyelet openings (not shown) which are precisely aligned such that they receive the free and protruding ends of the left pin 96 and the right pin 104. When the free ends of the left pin 96 and the right pin 104 are received in this fashion, they then become electrically connected to the RFI suppression circuit within the RFI module. In this way, when both the shield structure 20 and the RFI module are properly mounted on the fuel outlet end 86 of the fuel pump housing 92, the RFI module can then be electrically connected to an outside power source. When the RFI module is actually connected to the outside power source, electric power can then be communicated to the electric fuel pump motor 100 via the RFI suppression circuit, the left pin 96 and the right pin 104, the left wire 108 and the right wire 106, the positive and negative brushes, and the commutator. Once electric power is communicated to the electric motor 100 in this way, the electric motor 100 can then successfully operate the fuel pump 128 to draw fuel from a fuel tank via the fuel inlet 84 and thereafter deliver fuel under pressure to an engine via the fuel outlet conduit 24.

During operation of the electric fuel pump motor 100, stray noise directly or indirectly associated with the electric motor 100 is typically generated or created and begins to emanate therefrom. However, since the electric motor 100 along with its associated commutator and positive and negative brushes are primarily situated adjacent, within, and/or immediately underneath the hollow of the underside of the shield structure 20, stray noise emanating from the electric motor 100, the commutator, and/or the brushes is essentially arrested and captured specifically by the electrically conductive outer coat layer 82 of the shield structure 20. Once arrested in this fashion, electric energy from the captured noise in the outer coat layer 82 is then electrically conducted and communicated to the ground or ground circuit associated with the electric motor 100 via the inner coat layer 112, the ground pin 102, and the ground wire 110. By communicating the electric energy in the outer coat layer 82 directly to the ground associated with the electric motor 100, an excessive amount of electric energy is thereby prevented from accumulating in the outer coat layer 82. In this way, stray noise from the electric fuel pump motor 100 is largely prevented from emanating beyond the fuel pump housing 92 and the overall fuel pump assembly 94. As a result, stray noise is largely prevented from both reaching and adversely affecting the operation of sensitive electronic systems that are situated outside of and about the fuel pump housing 92.

In light of the above, it is to be understood that the outer coat layer on the shield structure can be electrically connected to the ground or ground circuit of the electric fuel pump motor in various different ways pursuant to the present invention other than the preferred manner specifically disclosed hereinabove. In general, when the shield structure is mounted on the fuel pump housing, all that is required pursuant to the present invention is that there be established a means for electrically grounding the outer coat layer to the electric fuel pump motor. Such a means dictates that an interconnecting and electrically conductive path be established between the outer coat layer and the ground of the electric motor whenever the shield structure is properly mounted on the fuel pump housing. Such an electrically conductive path may include, for example, electrically conductive wires, pins, fabricated or screen printed metal lines, or any other known electrical conductor or combinations thereof.

In addition to the outer coat layer 82 of the shield structure 20 comprising metal, it is to be understood that the walls of the fuel pump housing 92 of the fuel pump assembly 94 preferably comprise metal as well. In this way, when the shield structure 20 is properly mounted on the fuel pump housing 92, stray noise emanating from the electric motor 100 is substantially altogether "bottled up" and contained, thereby preventing the stray noise from both reaching and adversely affecting the operation of sensitive electronic systems that are situated outside of and about the fuel pump housing 92. Although other metals may alternatively be utilized, the walls of the fuel pump housing 92 preferably comprise steel with their inner surfaces and/or outer surfaces covered with stainless steel, zinc, or zinc-nickel. Such a preferred metallic composition helps to prevent corrosion and ensure the overall robustness of the fuel pump assembly 94. Given such a metallic composition, the walls of the fuel pump housing 92, along with the outer coat layer 82, are preferably electrically grounded to the electric fuel pump motor 100 as well. Although electrical grounding of the walls can be accomplished in many different ways, the walls of the fuel pump housing 92 are preferably electrically grounded to the electric motor 100 via the outer coat layer 82 as the shield structure 20 is properly mounted on the fuel pump housing 92 such that the outer coat layer 82 comes into electrical contact with the fuel pump housing 92.

While the present invention has been described in what is presently considered to be the most practical and preferred embodiment and/or implementation, it is to be understood that the invention is not to be limited to the disclosed embodiment, but on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A shield structure for reducing radio frequency interference from an electric motor situated within a fuel pump housing, wherein said fuel pump housing has an end adjacent the electric motor, said shield structure comprising:
   a hollow cup-like outer cover of an electrically insulative material mountable on the end of the fuel pump housing adjacent the electric motor, said outer cover having an inner surface and an outer surface;
   an electrically conductive outer coat layer adhered to and on essentially all of said outer surface of said outer cover; and
   an electric conductor electrically grounding said outer coat layer to the electric motor in the fuel pump housing.

2. The shield structure according to claim 1, wherein said outer cover comprises plastic.

3. The shield structure according to claim 1, wherein said outer coat layer comprises silver.

4. The shield structure according to claim 1, wherein said outer coat layer comprises silver-plated copper.

5. The shield structure according to claim 4, wherein said outer coat layer includes a binder comprising acrylic.

6. The shield structure according to claim 1, wherein said outer coat layer has a minimum thickness of about 0.0100 millimeters.

7. The shield structure according to claim 1, wherein said outercoat layer has a minimum thickness of about 0.012 millimeters.

8. The shield structure according to claim 1, said shield structure further comprising a fuel outlet conduit integral with both said inner surface and said outer surface of said outer cover such that said fuel outlet conduit defines a fuel outlet opening through both said outer cover and said outer coat layer.

9. The shield structure according to claim 1, said shield structure further comprising a fuel relief conduit integral with said inner surface of said outer cover such that said fuel relief conduit defines a fuel relief opening through both said outer cover and said outer coat layer.

10. The shield structure according to claim 9, wherein said fuel relief conduit is tapered for seating a fuel relief ball valve.

11. The shield structure according to claim 1, said shield structure further having two open-ended cylindrical retainer chambers defined through both said outer cover and said outer coat layer.

12. The shield structure according to claim 1, said shield structure further comprising two electrical conduits integral with said inner surface of said outer cover such that said two electrical conduits define two electrical conduit openings through both said outer cover and said outer coat layer.

13. The shield structure according to claim 1, wherein said electrical grounding conductor comprises:
    an electrical ground conduit integral with said inner surface of said outer cover such that said electrical ground conduit defines an electrical ground opening through both said outer cover and said outer coat layer; and
    an electrical conductor situated within said electrical ground conduit and electrically connected to said outer coat layer;
    wherein said electrical conductor is electrically connectable to an electrical ground of the electric motor.

14. The shield structure according to claim 13, wherein said electrical conductor comprises silver.

15. The shield structure according to claim 1, wherein said electrical grounding means comprises:
    an electrical ground conduit integral with said inner surface of said outer cover such that said electrical ground conduit defines an electrical ground opening through both said outer cover and said outer coat layer; and
    an electrically conductive inner coat layer formed on the inner surface of said electrical ground conduit and conterminous with said outer coat layer formed on said outer surface of said outer cover;
    wherein said electrical ground conduit with said inner coat layer is capable of closely receiving an electrically conductive pin electrically connected to an electrical ground of the electric motor.

16. The shield structure according to claim 15, wherein said inner coat layer comprises silver.

17. The shield structure according to claim 1 wherein said fuel pump housing comprises a wall of an electrically conductive metal encircling the electric motor and electrically connected with said outer coat layer on said outer surface of said outer cover.

18. A shield structure for reducing radio frequency interference from an electric motor situated within a fuel pump housing, wherein said fuel pump housing has an end adjacent the electric motor, said shield structure comprising:
    a hollow cup-like outer cover of an electrically insulative material mountable on the end of the fuel pump housing adjacent the electric motor, said outer cover having an inner surface and an outer surface;
    an electrically conductive outer coat layer adhered to and on essentially all of said outer surface of said outer cover;
    an electric conductor electrically grounding said outer coat layer to the electric motor in the fuel pump housing;
    two electrical conduits integral with said inner surface of said outer cover such that said two electrical conduits define two electrical conduit openings through both said outer cover and said outer coat layer; and
    said outer coat layer has discontinuities on said outer surface of said outer cover such that said outer coat layer is radially spaced away from each of said two electrical conduit openings on said outer surface, wherein said two electrical conduits are capable of closely receiving two electrically conductive pins for communicating electric power to the electric motor in such a way that the two electrically conductive pins are electrically isolated from said outer coat layer.

19. A shield structure for reducing radio frequency interference from an electric motor situated within a fuel pump housing, said shield structure comprising:
    a hollow cup-like outer cover of an electrically insulative material mountable on an end of a fuel pump housing such that said outer cover is adjacent brushes and a commutator of the electric motor, said outer cover having an inner surface and an outer surface;
    an electrically conductive outer coat layer adhered to and on essentially all of said outer surface of said outer cover; and
    an electric conductor electrically grounding said outer coat layer to the electric motor in the fuel pump housing.

20. The shield structure according to claim 19 wherein said fuel pump housing comprises a wall of an electrically conductive metal encircling the electric motor and electrically connected with said outer coat layer on said outer surface of said outer cover.

* * * * *

UNITED STATES PATENT AND TRADEMARK OFFICE
CERTIFICATE OF CORRECTION

PATENT NO.   : 6,541,883 B2
DATED        : April 1, 2003
INVENTOR(S)  : Bradley L. Uffelman It is certified that error appears in the above-identified patent and that said Letters Patent is hereby corrected as shown below:

<u>Column 10,</u>
Line 55, delete "0.0100" and insert -- 0.010 --.

Signed and Sealed this

Second Day of September, 2003

JAMES E. ROGAN
*Director of the United States Patent and Trademark Office*